C. CHIDLEY.
GURDEY.
APPLICATION FILED DEC. 10, 1912.

1,175,602.

Patented Mar. 14, 1916.
2 SHEETS—SHEET 1.

Witnesses
J. B. Groh
George H. Morse.

Inventor
Christopher Chidley.
By Henry L. Reynolds
Attorney.

THE COLUMBIA PLANOGRAPH CO., WASHINGTON, D. C.

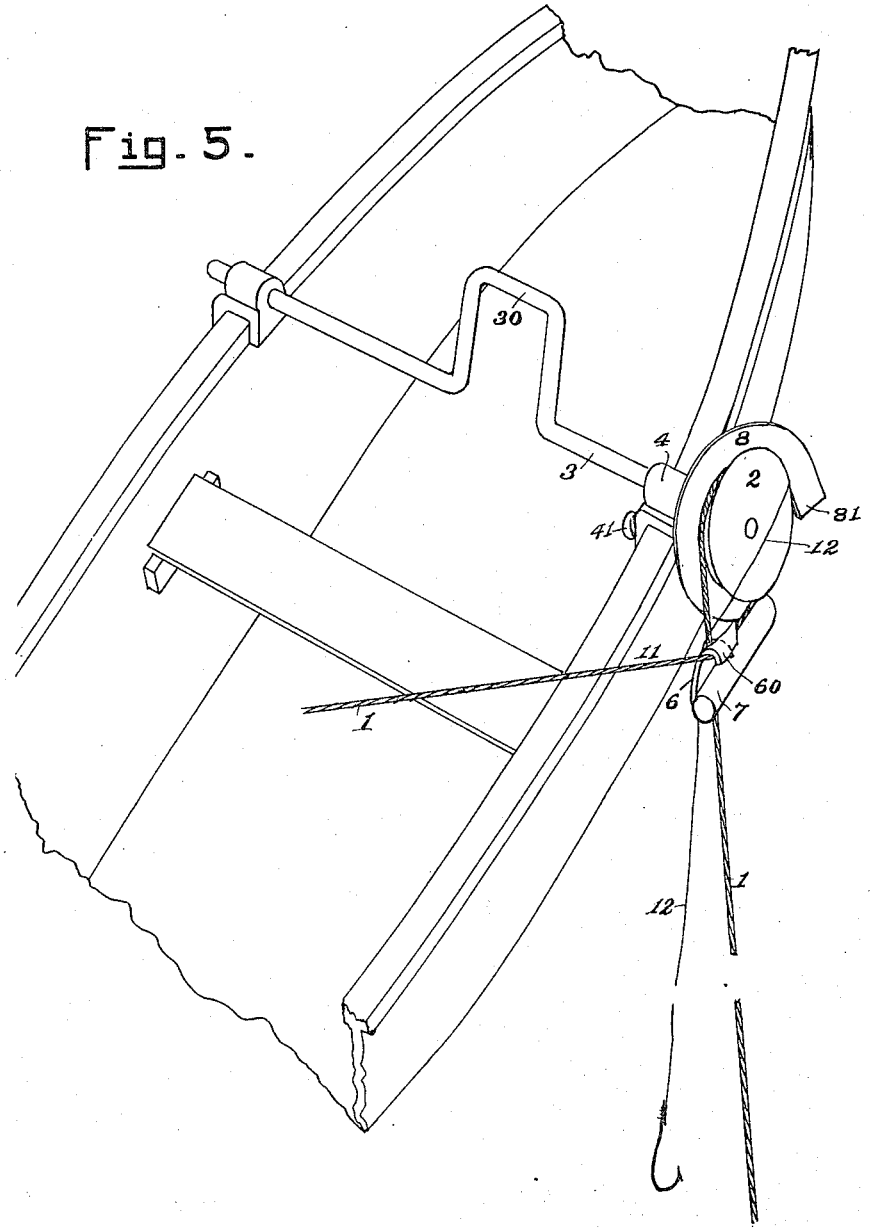

UNITED STATES PATENT OFFICE.

CHRISTOPHER CHIDLEY, OF SEATTLE, WASHINGTON.

GURDEY.

1,175,602.  Specification of Letters Patent.  Patented Mar. 14, 1916.

Application filed December 10, 1912. Serial No. 736,017.

*To all whom it may concern:*

Be it known that I, CHRISTOPHER CHIDLEY, a citizen of the United States, and resident of the city of Seattle, in the county of King and State of Washington, have invented certain new and useful Improvements in Gurdeys, of which the following is a specification.

My invention relates to gurdeys, or devices used for hauling in and handling lines used in deep sea fishing, especially such as are used in halibut fishing.

My invention comprises certain novel parts and combinations of parts which will enable my device to be operated at a greater speed than other devices used for somewhat the same purposes.

The features which constitute my invention are illustrated in the accompanying drawings, and will be hereinafter described in the specification and defined by the claims terminating the same.

In the accompanying drawings I have shown my invention embodied in the form which is now preferred by me.

Figure 1:
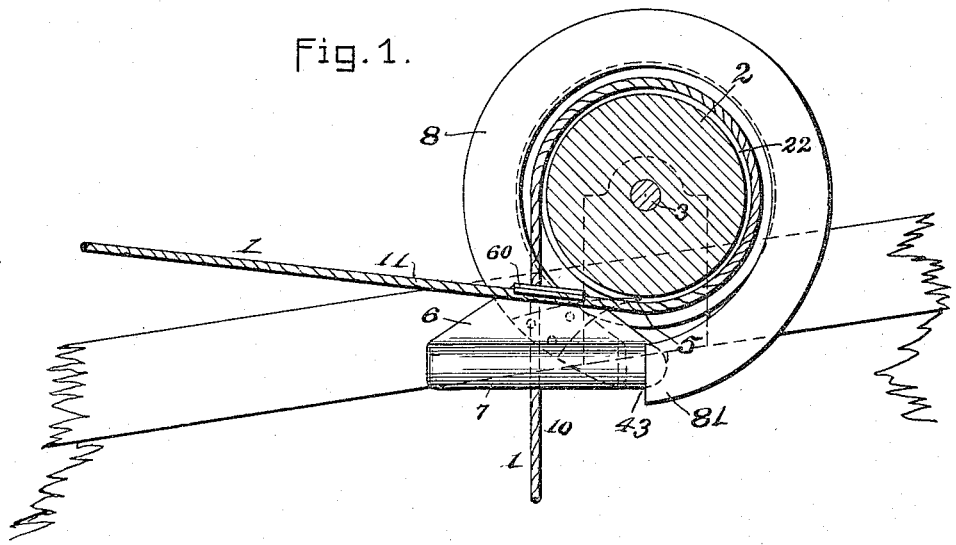
Figure 3:
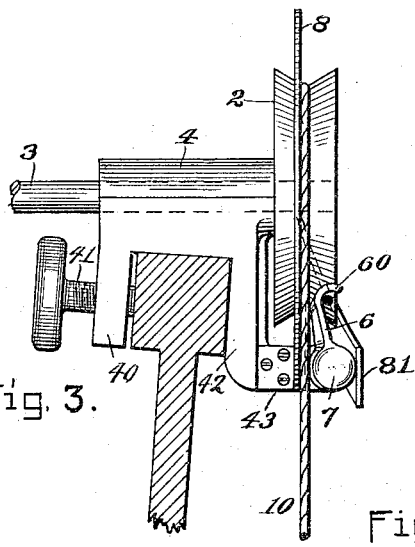
Figure 2:
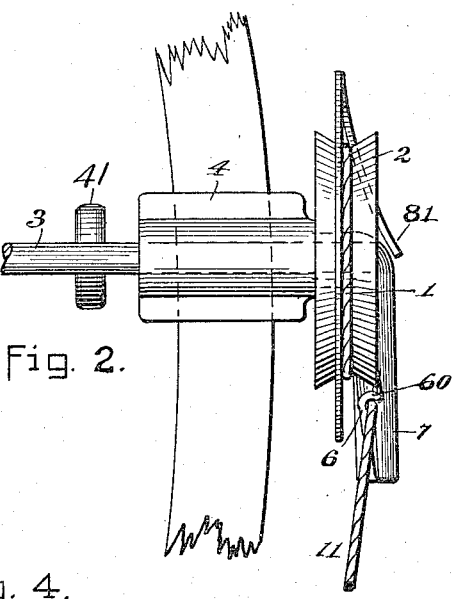
Figure 4:
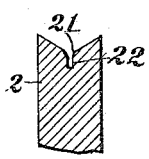

Figure 1 is an elevation of the device in place upon the gunwale of a dory, the wheel being in section, and the view being as seen from the outer side of the dory. Fig. 2 is a plan view of the same. Fig. 3 is an elevation looking forward. Fig. 4 is a fragmentary cross section of the wheel rim, showing its groove and slit. Fig. 5 is a perspective view of my device applied to a boat, and illustrated as it would appear in actual service.

In halibut fishing the fish are found upon the bottom, and usually at a considerable depth. The use of a long and strong line is thus necessitated. This main line has a number of shorter and smaller lines, fastened to it at frequent intervals, upon which are the hooks by which the fish are actually caught. My invention is designed to assist in the handling of this large main line, and to prevent the tangling of the short lines and their attached hooks when hauling in.

A bearing member 4 has a pair of depending ears 40 and 42, which are adapted to span the gunwale of a dory. A clamping screw 41 secures this member in place. A shaft 3, formed with a crank 30, is journaled in bearing member 4, and preferably extends entirely across the boat to another bearing member, as shown in Fig. 5. This shaft may be turned by any suitable means. I prefer to employ for this purpose a small gasolene engine, thus relieving the fisherman of the labor of handling the line, and increasing the speed of handling the same. This engine, as it forms no part of the present invention, has not been illustrated.

The wheel 2, about which the main line 1 passes, is secured upon the extreme outer end of shaft 3, and turns therewith. Shaft 3 is flush with or inside of the outer plane of the wheel, for reasons which will later appear. The periphery of wheel 2 is concaved or hollowed to direct the oncoming line to its central plane. I prefer that the angle of slope of the line-seating section of the periphery of the wheel be sharper than the angle of slope of the portions outward therefrom, as shown at 21 in Fig. 4. By reason of this construction, the line will be wedged in place while seating itself, and will be securely gripped by the wheel. At the bottom of this line-seating section of the wheel periphery, I provide a narrow slit 22, which is too small to permit the entrance of the line, but into which the tip of a line-clearing point 5 enters, thereby insuring the release of the line from its seating groove in the wheel when it reaches the proper point.

The line guides are preferably secured to an extension 43 of the ear 42, which is part of the bearing member 4. These guides consist of a leading-on guide 7, and a leading-off guide 60, and a separator plate 6. These guides are herein shown as made in one piece, and they may be integral with or supported from the extension 43. While these parts may be made from a plate of sheet metal bent into the desired shape, they are here shown as cast integral with the arm 43.

The leading-on guide consists of a bar 7 of some material size. It extends toward the rear of the boat at a sufficient distance from the sides of the boat to furnish ample room for the passage of the main line and its attached short lines and their hooks. This guide is made of a material size so that the hooks cannot catch over it, they being too small.

The leading-off guide is concaved outwardly and downwardly, and extends over the main line. This guide prevents the leading-off portion of the line from rising or interfering with the leading-on portion while leading it off of the wheel and into the dory. Preferably it is located and shaped so that it deflects the line somewhat outwardly of the center plane of the wheel, the object of this being to provide more room for the upward passage of the small lines and their hooks.

The separator plate 6 is a relatively flat, plate-like member which connects the leading-on and leading-off guides. Its function is to at all times keep the two parts of the main line clear of each other.

A line-clearing member which has a thin point 5 entering the slot 22 in the wheel, is provided. This point lies inside the line, and compels release of the line from the groove in the wheel, should there be any tendency for it to stick. This line-clearing point 5 is formed upon a plate which I have shown as secured to the fixed end of the guard or guide 8, although it may be supported from any other convenient point.

The leading-on guide 7, previously described, is an outboard guide. I provide in addition an inboard guide which is also a leading-on guide in a certain sense, but which is also designed to take care of the small lines and hooks at certain times, and to guide them about the wheel, as will be described later. This guide 8 is composed of a flat bar bent to fit rather closely about the periphery of the wheel 2. The end next to the leading-on part 10 of the main line 1 is secured to the arm 43. The other end 81 is preferably bent outward to overlap the outboard guide 7 and arm 43. Guide 8 is placed with its inner edge close to, but not touching the line as it passes about the wheel, and in a plane just within the central plane of the wheel, or that plane in which the line lies in passing about the wheel. It is always inside the line on the wheel.

When a line is to be hauled in, it is first looped about the wheel, as shown in Figs. 1 and 5, and the wheel turned by power or otherwise. This draws in the line, part 10 passing between guides 60 and 7, and the boat. Part 11 passes under guide 60, and is thereby drawn slightly to one side of part 10. From thence it passes into the boat. Now, when the small lines 12, which are fastened to the main line 1, reach the wheel, they may be allowed to pass about the wheel, provided they have no fish thereon. The hooks, being too small, cannot catch on guide 7. They pass partly about the wheel, and then start to drop as they reach the other side. When this occurs their point of attachment to the main line has already passed the guide 60. They fall, but the line 12 is caught by the end 81 of guide 8, and is flung outward. The hook is thrown out clear of the on-coming part 10 of the main line, and hangs from its point of attachment beyond the guide 60.

When a fish is attached to one of the lines 12 the proceeding is somewhat different. The line 12 is caught by hand as it comes up to the wheel, and drawn in to provide a little slack. The point of attachment of this line passes onto the wheel, and the slack is then passed over the outer edge of the wheel, as shown in Fig. 5. The upper part of line 12 then passes across the face of the wheel, but not around it. The point of attachment passes under guide 60, over which passes a short section of line 12, as shown by dotted lines in Fig. 5, and the main line 1, and its attached short line is then pulled free of the guides and hauled into the boat.

The hook carrying the fish never passes about the wheel. At the same time the empty hooks which do pass about the wheel are so guided as to surely clear the main line and not become entangled. The process of passing the lines 12 about the edge of the wheel to avoid passing the fish thereabout is not an automatic action, but is controlled by hand and with very little labor to the fisherman. If desired the lines carrying the empty hooks may also be passed across the face of the wheel, to thereby avoid passing the hooks about the wheel. Guide 8 would then function merely as an inboard guide for the main line.

What I desire to secure by Letters Patent is:

1. In a gurdey, in combination, a grooved line-receiving wheel journaled to turn in a plane approximately parallel with and overhanging the side of a boat, a leading-on guide extending approximately parallel the side of the boat and in a plane outside that of the groove in the wheel and approximately tangent the lower edge of the wheel, and a separator extending upward from the leading-on guide and having its upper edge curved outward and over to form a leading-off guide.

2. In a gurdey, in combination, a line-receiving wheel journaled to turn in a plane approximately parallel with and overhanging the side of a boat, a leading-on guide extending horizontally in approximate alinement with the lower edge of the wheel and outside the center plane of the groove therein, a separator extending upward from the leading-on guide and having its upper edge turned outward and over to form a leading-off guide, and an inboard line guide extending about the wheel with its inner edge close to the periphery of the wheel and inward from the central plane thereof.

3. In a gurdey, in combination, a grooved line-receiving wheel journaled to turn in a plane approximately parallel with and overhanging the side of a boat, a leading-on guide extending horizontally in approximate alinement with the lower outer edge of the wheel, a separator extending upward from the leading-on guide and having its upper edge curving outward and over to form a leading-off guide, and a line-clearing point at the lower side of the wheel.

4. In a gurdey, in combination, a frame member provided with means for securing it to the gunwale of a boat, a shaft journaled in said frame, a line carrying wheel or pulley secured to the outboard end of said shaft, an arm extending from said member downward and outward beneath said wheel, a leading-on guide extending from said arm horizontally substantially parallel with the side of the boat and a separator and leading-off guide supported from said arm and above the leading-on guide.

5. In a gurdey, in combination, a frame provided with means for securing it to the gunwale of a boat, a shaft having a bearing in said frame and projecting outboard, a line receiving pulley on the outboard portion of said shaft, an arm extending downward and outward from the frame beneath said pulley, an outboard leading-on guide for the line carried by said arm, an inboard leading-on guide for the line carried by said arm and extending as an arch peripherally over the pulley and a leading-off guide extending over the outboard leading-on guide.

6. In a gurdey, in combination, a frame provided with means for securing it to the gunwale of a boat, a wheel journaled upon said frame to overhang the side of the boat, and having a grooved periphery for the reception of a line, said groove terminating at its bottom in a slit which is too narrow to receive the line therein, an arm extending from the frame downward and outward beneath the lower edge of the wheel, a leading-on guide extending from said arm in a horizontal direction approximately in line with the lower outer edge of the wheel, and a line-clearing point supported from said arm and entering the slit in the wheel at its lower side.

7. In a gurdey, in combination, a frame provided with means for securing it upon the gunwale of a boat, a wheel journaled upon said frame to overhang the side of the boat and having a line-receiving groove in its periphery and a narrow slit at the bottom of said groove of a width too small to permit entrance of the line therein, a leading-on guide extending horizontally in alinement with the outer lower edge of the wheel, a separator and leading-off guide located above said leading-on guide, and a line-clearing point entering the slit in the wheel at its lower side.

8. In a gurdey, in combination, a frame provided with means for supporting it from the gunwale of a boat, a wheel journaled upon said frame and overhanging the gunwale of the boat, the outer side of said wheel being clear to permit throwing a line thereon, an arm extending from said frame downward and outward beneath the wheel, a leading-on guide extending from said arm horizontally and approximately in line with the lower outer edge of the wheel, and a separator extending upward from said leading-on guide, the upper edge of the separator curving outward and over to form a leading-off guide.

9. In a gurdey, in combination, a frame provided with means for securing it upon the gunwale of a boat, a shaft journaled upon said frame and extending in a direction crosswise the boat, with its end projecting beyond the side of the boat, a grooved line-receiving wheel mounted upon the outer end of said shaft and outwardly clear to permit throwing a line thereabout, said wheel having a slit at the bottom of its groove of a width too narrow to permit entrance of the line, an arm extending outwardly from the frame beneath the wheel, a leading on guide extending horizontally from said arm and being approximately in alinement with the lower outer edge of the wheel, a separator extending upwardly from said leading-on guide, the upper edge of the separator being turned outward and over to form a leading-off guide, and a line-clearing point entering the slit in the wheel at its bottom side.

In testimony whereof I have hereunto affixed my signature at Seattle, Washington, this 4th day of December, 1912.

CHRISTOPHER CHIDLEY.

Witnesses:
H. L. REYNOLDS,
JACOB B. GROH.

Copies of this patent may be obtained for five cents each, by addressing the "Commissioner of Patents, Washington, D. C."